Patented Nov. 18, 1947

2,430,863

UNITED STATES PATENT OFFICE 2,430,863

PROCESSES FOR RECOVERING VALUES FROM CALCEROUS AND SILICEOUS MATERIALS

Henry Seymour Colton and Robert W. Frischmuth, Cleveland, Ohio, and Raymond L. Knowles, Bronxville, N. Y.

No Drawing. Original application May 5, 1941, Serial No. 391,978. Divided and this application September 21, 1945, Serial No. 617,702

1 Claim. (Cl. 23—121)

This invention relates to chemical processes for recovering values from water-insoluble calcerous and siliceous compounds.

Such compounds, or ores, are found in nature, illustrative of which are: the compound of calcium and phosphorous oxides known generally as phosphate rock, or in some cases known as apatite; and the compound of calcium and sulphur oxides known as gypsum; and the compound of silicon and potassium and aluminum oxides, known as feldspar; and the compound of calcium and tungsten oxides, known as calcium tungstate, or in some cases, known as scheelite; etc.

All of these are cheap natural materials, and in some instances insoluble compounds of calcium and silicon oxide are present in cheap commercial or waste material, such for example as commercial glass, a compound of sodium, silicon, and calcium oxides.

The values to be recovered as contemplated by the present invention are those represented by the tungsten, phosphorous, potassium, sulphur, sodium, etc. radicals of the natural substances.

Processes have been proposed heretofore for recovering the values from such insoluble compounds, but in such prior processes, because of the highly insoluble character of the materials, it has been proposed to attack them with caustic alkalis, or with acids, etc.

It has also been proposed to recover the values from such insoluble compounds by causing the calcium oxide of such a compound to unite with silicon oxide (or vice versa) as for example in the well-known process of making phosphorous from phosphate rock in which silicon oxide is caused to unite with the calcium oxide of the rock, and release the phosphorous oxide; but to effect the union of calcium and silicon oxides, where they are already combined with other oxides, has heretofore required that they be subjected to very high temperature such as that developed in the electric furnace.

Consequently, all such prior processes are expensive to practice, either because of requiring expensive reagents such as the caustic alkalis, acids, etc.; or the expense of producing high temperatures; or because of necessary expensive intermediate reactions between the original material and the finally recovered value.

The present invention has solved this problem in a very economical manner, and comprises, generally speaking, the making of an intimate mixture of two (or more) such insoluble materials which comprise silicon and calcium oxides respectively, as components, and which also comprises respectively, values which have a strong natural affinity for each other; and subjecting the mixture to the action of heat and pressure in the presence of water, and under pre-selected conditions to be more fully set forth. We have found that the reaction thereby produced causes the silicon and calcium oxides to unite and release the said values, which combine into a water-soluble combination and may be dissolved out of the reaction product by simple water solution, and crystallized out of the solution.

Accordingly the process has great commercial value because of the cheapness of the original materials, the simplicity of the apparatus and process, and the over-all economy with which the end compound may be produced.

Such natural water-insoluble materials are often found combined with impurities, such for example as small quantities of metal oxide; or impurities such as fluorine which is almost always found in phosphate rock; and in some processes for recovering the values from the original materials, the reagents employed, being acid, or the value of the original material being first recovered in acid form, these impurities come out of the original material and appear in the recovered value product; and in order to derive the value from the original material in relatively pure form, additional processes must be performed to purify the end product. Many such additional processes have been proposed, but the necessity of performing them to arrive at a pure end product adds still more to the over-all expense of the process.

In the practice of the present invention it has been strikingly demonstrated that such impurities remain in water-insoluble combination with the united silicon and calcium, whereby the water-soluble end product comes out in pure form.

It is therefore among the objects of the invention:

To provide generally an improved chemical process;

To provide an improved process for recovering values which are combined with insoluble calcerous and/or siliceous material;

To provide an improved process for making alkali metal-acid compounds;

To provide an improved process for recovering in fluorine-free condition, the radical value of insoluble material containing fluorine;

To provide an improved process for recovering values from cheap materials containing calcium and silicon;

To provide an improved process for breaking down the chemical bond of water-insoluble calcerous and/or siliceous compounds and recovering valuable products therefrom.

Other objects will become apparent to those skilled in the art to which our invention appertains, from a reading of the following description of the practice of our invention.

Hereinafter quantitative examples by which this invention may be practiced will be given but in order to make more clear the characteristics of the process the following general experiments may first be considered.

If pulverized phosphate rock, or apatite, a calcium and phosphorous oxide combination represented by $Ca_3(PO_4)_2$, and pulverized commercial waste glass, comprising in general, sodium, calcium and silicon oxide, are mixed together and put into an autoclave with water, and therein subjected to heat and pressure, a reaction product is formed; and if the reaction product, removed from the autoclave, is washed with water, the water dissolves out part of the reaction product, which on analysis is found to be soluble sodium phosphate represented by $Na_3PO_4$, and the residue of the reaction product is found to be a water-insoluble calcium silicate. The sodium phosphate may be crystallized in pure form out of the water solution.

Again, if apatite and feldspar, the latter a potassium, aluminum and silicon oxide compound represented by $K_2O, Al_2O_3 6SiO_2$ be reacted in a manner similar to that just described, a water solution will dissolve out of the reaction product, potassium phosphate, represented by $K_3PO_4$, leaving a residue which is a water-insoluble hydrated calcium and aluminum silicate, composed of weakly combined calcium and silicon and aluminum hydroxides.

Again, if feldspar and gypsum, the latter a natural calcium sulphate represented by $CaSO_4$ be reacted together in a similar manner, a water solution will dissolve out of the reaction product, potassium sulphate represented by $K_2SO_4$, leaving again a residue of water-insoluble calcium and aluminum silicate, composed of weakly combined calcium and aluminum and silicon hydroxides.

Similarly, calcium tungstate, or scheelite represented by $CaWO_4$, reacted with feldspar yields water-soluble potassium tungstate.

Economical and commercial advantages accrue from the utilization in the autoclave charge of only cheap, natural, siliceous and calcerous compounds such as natural ores, or cheap waste commercial materials such as glass.

Natural phosphate rock, almost invariably contains a small proportion of fluorine, and fluorine, even if in only a slightly detectable proportion, is a harmful ingredient in sodium or potassium phosphate derived from the ore; and to render these products fit for some commercial fields, the presence of fluorine therein must be avoided.

We have found that when the above process is practiced with an ore containing fluorine, and with silicon and calcium oxides present in the autoclave charge as described, the water-soluble product dissolves out free from detectable fluorine, the fluorine, however, being detectable in the residue of the reaction product.

We have found that the action described, under the conditions of heat and pressure in the presence of water, is a hydrating action with respect to the calcium and silicon and metal oxides. In fact, the calcium and the silicon oxides are so completely hydrated to calcium hydroxide and silicon hydroxide that the silicon hydroxide takes the form of active silicic acid and it may be recovered as active silicic acid by dissolving the calcium hydroxide out of the mixture by hydrochloric acid, thus making possible the recovery of active silicic acid as a by product of this process.

The production of active silicic acid sometimes referred to as adsorbent silica gel by such hydration process constitutes the subject matter of the co-pending application of Colton, Knowles, and Frischmuth, Serial No. 380,912, filed February 27, 1941, for Improvements in silicic acid and processes for making the same, to which reference may be had, and is being claimed therein.

The hydrating process proceeds with respect to impurities which may be present in the form of metal oxides. These also are converted into water-insoluble hydroxides by the process, and they are mixed in weak combination with the hydrated silicate of the reaction product in water-insoluble condition; so that when the water-soluble product is dissolved out of the reaction product, they stay behind in water-insoluble form. Fluorine if present remains behind as water-insoluble fluoride. The end product is therefore scavenged or purified automatically by the process.

A fuller discussion of the process of converting silicon oxide and base-forming element oxides into a mixture of hydroxides by the action of water, heat, and pressure may be found in the above-mentioned pending application Serial No. 380,912.

The water-soluble end product in the above-mentioned experiments may be crystallized out of the water solution in each instance by the usual crystallization methods, as will be understood.

In mixing together the ingredients to make the reaction charges referred to in the above-described experiments, as for illustration in the apatite and glass experiment, and in order that substantially all of the values, in this illustrative case the sodium and phosphorous values, may be recovered, it may be expedient to first analyze the materials and determine the proportions in which the said values are present in the material and then to mix the materials in such proportion by weight that there will be the correct molecular proportion of the values to produce the end product combination, as for example in the illustrative case of sodium and phosphorous to produce sodium phosphate.

Also it will be desirable that the quantity of water added to the charge mixture will be sufficient to hydrate the insoluble components of the mixed materials by the process as described or to provide a solution in which the reaction can take place.

This stoichiometric proportioning of the reacting components of the charge will be understood by those skilled in the art, and in any event is provided for in the quantitative illustrative examples, presently to be described.

From the results of the experiments described above which we have made, we have concluded that the character of the process is as follows:

The action of the heat and pressure and water, on the charge containing silicon and calcium oxides and their respectively combined values, effects a reaction which causes the silicon and calcium oxides to unite, thereby releasing their respective values, and causing the latter to combine by affinity into a water-soluble combination; and that the calcium and silicon oxides and the impurity components such as metal oxides, are hydrated into water-insoluble hydroxide form; that their union is of the nature of a weak combination which while perhaps not as strong as that of the said values because of their affinity for each other, is strong enough to release the said values; and that the fluorine remains with the hydroxides by reason of its known tendency to go into the most insoluble union which it can make with associated elements or compounds.

Having now described the underlying principle of our invention we here give quantitative examples by which the invention may be practiced, these examples being directed in the main to the practice of the process with cheap original materials as referred to hereinbefore.

*Example 1*

To recover potassium phosphate from feldspar and phosphate rock, take 100 grams of phosphate rock, and 100 grams of feldspar, pulverized to 200 mesh, and thoroughly mix and charge into an autoclave with 200 cubic centimeters of water, and 1% of a wetting agent as disclosed in our parent application. The purpose of the wetting agent is explained later.

Close the autoclave and heat the charge to 600° F. and subject it to the corresponding vapor pressure which will be approximately 1,000 lbs. per square inch. After this temperature and pressure have been attained, allow the reaction product to cool and remove it from the autoclave.

Wash the reaction product with water, which will dissolve out potassium phosphate, and which may be recovered from the water solution by crystallization. The residue of the reaction product is a complex calcium aluminum silicate.

*Example 2*

To recover sodium phosphate from phosphate rock and glass, take 100 grams of ordinary commercial glass containing sodium, calcium, and silicon oxides, and mix with 100 grams of phosphate rock, both pulverized to 200 mesh, and put them into the autoclave with 200 cubic centimeters of water. Heat the contents to 600° F. and subject it to the corresponding vapor pressure which will be approximately 1,000 lbs. per square inch. Wash the reaction product with water and thereby dissolve out sodium phosphate, leaving as the reaction product residue a calcium silicate.

*Example 3*

To make potassium sulphate from feldspar and gypsum take 200 grams of feldspar mixed with 200 grams of gypsum, both pulverized to 200 mesh, and mix these with 300 cubic centimeters of water, and charge into the autoclave and react as above at 600° F. and approximately 1,000 per square inch pressure.

Wash the reaction product thus obtained with water and dissolve out potassium sulphate.

In this example, the potassium sulphate is not completely isolated, some aluminum sulphate also dissolving out of the reaction product in the water, both being water-soluble.

Furthermore, while the potassium sulphate is entirely removed from the reaction product by the water solution and demonstrates the principle of the invention as set forth hereinbefore, some of the aluminum sulphate remains in the residue. This residue is a calcium silicate mixed with some aluminum sulphate.

*Example 4*

To make potassium tungstate from scheelite and feldspar, pulverize 350 grams of scheelite and 200 grams of feldspar to 200 mesh and put into the autoclave with 300 cubic centimeters of water and react as before at 600° F. and approximately 1,000 lbs. pressure per square inch. The reaction product washed with water solution yields water-soluble potassium tungstate, leaving a residue of calcium aluminum silicate.

In the foregoing examples, the silicon oxide as described hereinbefore, is converted into silicon hydroxide, mixed with another hydroxide or hydroxides, and after the water-soluble combination has been dissolved out of the reaction product, the residue may be treated with acid, such as a 10% solution of hydrochloric acid to remove the other hydroxide or hydroxides, leaving behind the silicon hydroxide, which on examination will be found to be silicic acid, or adsorbent silica gel as referred to above.

In the foregoing examples the preferred temperature and pressure specified and utilized for producing the desired reaction product are not critical but may be lower or higher so long as they are sufficiently high to effect the reaction as described; and the exact proportions of the siliceous and calcerous ingredients are not critical nor is the quantity of water critical, so long as enough water is used to provide a solution in which the reaction may take place, and to provide sufficient water to effect the hydration of the oxides as referred to.

We have found also that the pressure and temperature required to complete the reaction can in general be lowered if small proportions of a wetting agent be added to the water when charged into the autoclave and therefore, while not essential, we prefer to use a wetting agent. A suitable wetting agent is that disclosed in our parent application and a suitable percentage is that shown above for Example 1. A wetting agent may likewise be used in the other examples.

In these examples the autoclave was heated electrically by an electric resistance coil and the pressure was the pressure attained by the water vapor pressure at the attained temperature.

If lower temperature and pressure were utilized, more time would be required for the reaction to become complete. With the temperature and pressure specified above, the reaction is complete as soon as the temperature is attained. Higher temperatures and pressures could be used without any corresponding chemical advantage, and with economic disadvantages.

There are, as is well-known, alternative modes of operation of an autoclave to attain temperature and pressure therein such as the introduction of steam therein to produce the desired temperature and pressure, the steam being generated in an external boiler, and in such case, water for the reaction may be derived from the steam, and we contemplate these alternative modes of operating the autoclave in the above experiments, and such alternative modes of operation being well-known it is believed unnecessary to describe them further herein.

The materials utilized in the above experiments and illustrative examples, illustrate the character of our invention and show how it may be practiced in a practical commercial manner but as will be understood there are other materials to the reaction of which the process is applicable and our invention is not limited to the particular materials specified, and as will be understood such other materials will produce other end products.

Some of the above-described water-soluble end products, such for example as those comprising potassium or potassium and phosphorous, have well-known value as agricultural fertilizing material. In general, the water-soluble end products above-mentioned are less soluble in water at ordinary temperature than in hot water and therefore when used as fertilizers they will dissolve slowly in the soil water, and not burn the plant rootlets; but the leaching into the soil of such fertilizer material may be made still more gradual and therefore better adapted to fertilization, if it is mixed with a carrier; and the insoluble residue of this process provides an ideal carrier.

To this end the reaction product comprising a mixture of hydrated silicate and the water-soluble fertilizer product may be left in mixed state, without isolating the water-soluble component by water solution; or if first isolated, the water-soluble product may be again mixed with a part of the insoluble residue; and the mixture in either case may be used as fertilizer.

The hydrated calcium oxide in such mixture will counteract acidity of the soil; and the use of such fertilizer mixture therefore will not acidulate the soil and require subsequent neutralization of the soil by lime or the like as is the case with many known fertilizers because of their having acid content.

We therefore contemplate the production by our process of an antiacid fertilizer which as described may be in some cases the reaction product of the process as it comes from the autoclave.

By the practice of our invention as described and illustrated by examples, commercial products of value can be economically manufactured and we contemplate the inclusion, within the scope of our invention, of the practice of our invention with all materials to produce all products, and with all modifications and variations of the process, which come within the scope of the appended claims.

This application is divisional from our application, Serial No. 391,978, filed May 5, 1941, now Patent Number 2,387,746 of October 30, 1945, for Processes for recovering values from calcerous and siliceous materials.

We claim:

The process of obtaining potassium sulphate as a water soluble metathetical compound of the potassium component of feldspar, and the sulphur component of gypsum, which comprises: intimately mixing the said materials, in finely divided form, with water, and causing the mixture to react through the sole agency of elevated temperature and pressure, by subjecting it to a temperature of approximately 600° F. and a pressure of approximately 1000 lbs. per square inch; and removing the said water-soluble compound from the reacted product by water solution.

HENRY SEYMOUR COLTON.
ROBERT W. FRISCHMUTH.
RAYMOND L. KNOWLES.

REFERENCES CITED

The following references are of record in the file of this patent:

UNITED STATES PATENTS

| Number | Name | Date |
| --- | --- | --- |
| 2,394,362 | Burwell | Feb. 5, 1946 |
| 2,390,687 | Boericke et al. | Dec. 11, 1945 |
| 2,336,180 | Lippman, Jr., et al. | Dec. 7, 1943 |